May 19, 1964 W. D. JEFFERS 3,133,373
FISH LURE
Filed Oct. 31, 1960
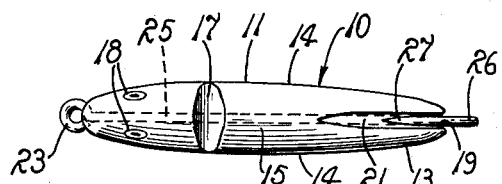
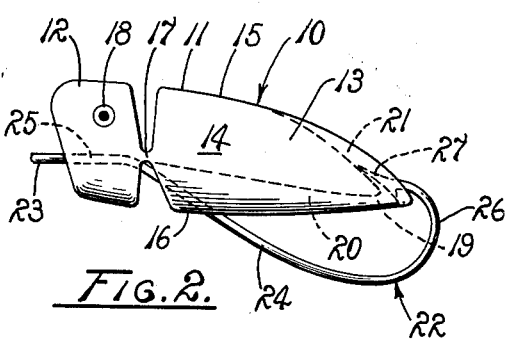
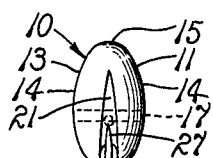
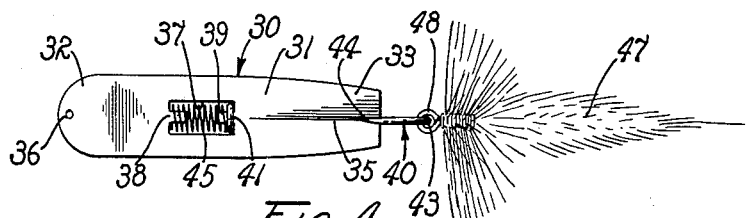
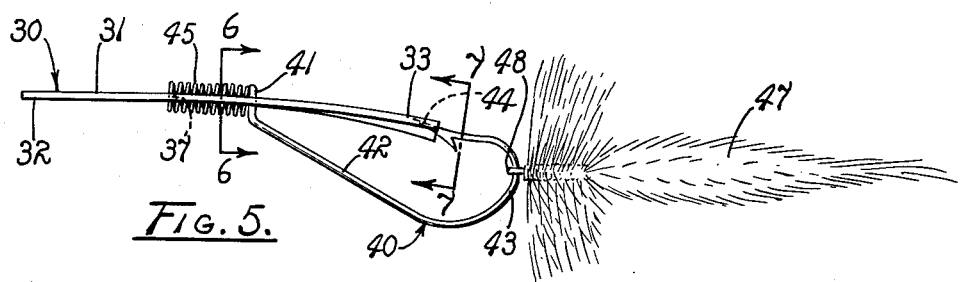
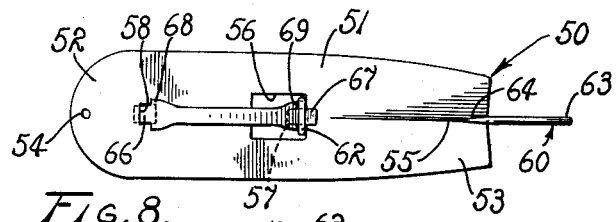
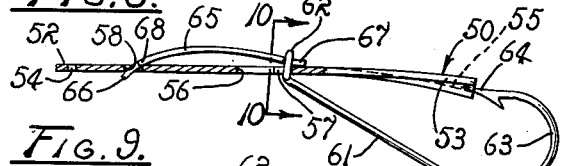
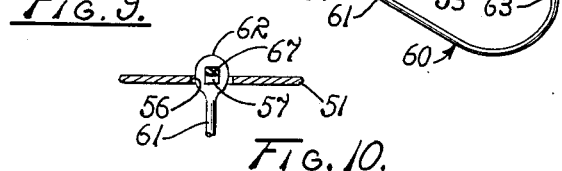
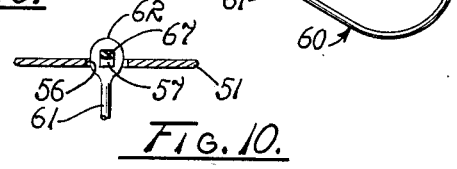
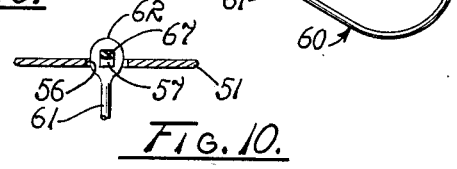
WILLIAM D. JEFFERS
INVENTOR
HUEBNER & WORREL
ATTORNEYS
BY Richard M. Worrel //
United States Patent Office 3,133,373
Patented May 19, 1964

3,133,373
FISH LURE
William D. Jeffers, 2815 Wishon Ave., Fresno, Calif.
Filed Oct. 31, 1960, Ser. No. 65,970
1 Claim. (Cl. 43—42.41)

The present invention relates to a fish lure and more particularly to such a lure having a fishhook releasably closed by a lure body.

Fish lures having exposed hooks frequently become entangled in weeds, bushes, trees and the like as they are drawn through the water or are cast through the air. Such entanglement frequently results in breakage of the line and loss of the lure. More frequently, however, the hook accumulates weeds, twigs, moss and other debris which precludes effective biting of the hook by a fish. When handling such a lure, the open hook is also more likely to become impaled in fingers or in some other portion of the body.

Conventional lures have been known to provide a plurality of resilient wires adjacent to the barbed end of the hook intended to divert extraneous matter therefrom. Such wires however, interfere with passage of the hook into the mouth of a fish, are subject to permanent bending, and are ineffective to prevent angular entry of debris and other such matter into the hook. Furthermore, the barbed end of the hook is exposed between the wires which creates hazardous handling problems. In addition, fish are frequently shy or hesitant about striking a hook which is so exposed.

It is therefore an object of the present invention to provide a fish lure which is readily passable through weeds, moss, twigs, and the like without being fouled thereby.

Another object is to provide a fish lure which minimizes or precludes the accumulation thereon of weeds, moss, twigs, and other debris.

Another object is to provide a fish lure which can be more safely handled than conventional lures.

Another object is to provide such a lure having a fishhook partially concealed by the lure.

Another object is to provide such a lure wherein the hook is releasably closed by the lure and is easily opened by a fish striking the hook.

Another object is to provide such a fish lure having an improved attraction for fish, which is economically manufactured, easily assembled, of durable structure, and convenient to use.

Other objects and advantages of the present invention will become apparent in the subsequent description in the specification.

In the drawing:

FIG. 1 is a top plan view of a fish lure embodying the principles of the present invention.

FIG. 2 is a side elevation of the lure of FIG. 1.

FIG. 3 is an end elevation of the lure of FIG. 1.

FIG. 4 is a top plan view of a second form of fish lure embodying the principles of the present invention.

FIG. 5 is a side elevation of the lure of FIG. 4.

FIG. 6 is a fragmentary section taken on line 6—6 of FIG. 5.

FIG. 7 is a fragmentary section taken on line 7—7 of FIG. 5

FIG. 8 is a top plan view of a further form of the fish lure embodying the principles of the present invention.

FIG. 9 is a side elevation of the lure of FIG. 8 with portions broken away for illustrative convenience.

FIG. 10 is a fragmentary section taken on line 10—10 of FIG. 9.

Referring more particularly to the drawing, the preferred embodiment of the fish lure of the present invention is indicated at 10 in FIG. 1. The fish lure comprises an elongated bait simulating body 11 which includes a forward head portion 12 and a rearwardly tapering tail portion 13. The body is made from any suitable plastic or hard rubber composition having the desired degree of resiliency. Many such materials are available in a wide variety of colors, several of which are purported to be attractive to fish. The body has opposite sides 14, a top or dorsal surface 15 and a bottom or ventral surface 16. The head and tail portions are interconnected by a constricted portion 17 which provides desired additional flexibility between the head and tail of the body. A pair of simulated eye members 18 are mounted on opposite sides of the head in order to provide a more lifelike appearance to the lure. The rearward tail portion 13 includes an elongated centrally disposed relatively narrow groove 19 therein having a lower portion 20 which extends longitudinally the full length of the ventral surface 16 of the tail. The groove continues upwardly and forwardly over the tail to form an upper portion 21 in the dorsal surface 15 of the tail for a purpose soon to be described.

A conventional fishhook generally indicated at 22 includes a forward eye portion 23 which is adapted for connection to the end of a fishing line not shown. The fishhook further includes a shank 24 having a forward portion 25 integral with the eye 23 and is extended rearwardly therefrom. The forward portion of the shank is rigidly secured in the head of the body, as by being bonded thereto or embedded therein, and is rearwardly extended through the lower portion 20 of the groove in diverging relation to the tail of the body. A curved or return bend portion 26 integral with the rearward extension of the shank includes a barbed end 27 which is adapted to rest within the upper portion of the groove 19 in the tail. In this manner, the groove conceals the barbed end of the fishhook so that as the lure passes through the water, weeds, moss, and the like are prevented from becoming entangled with the hook. With the flexibility provided by the constricted portion 17, the tail is easily compressible toward the shank 24 by a fish striking the lure. At such time, the shank is received fully within the lower portion of the groove and the return bend is opened to expose the barbed end of the hook to the mouth of the fish.

Second Form

A second form of the present invention is indicated at 30 in FIGS. 4 through 7 and provides an elongated substantially flat body having a rounded forward portion 32 and a tapered rearward portion 33. The body is preferably formed of a non-corrosive metal strip which is curved slightly at the rearward portion 33 from the horizontal axis of the body. As best shown in FIG. 7 the rearward portion includes a V-shaped groove 35 which extends forwardly longitudinally of the body. The forward portion includes a bore 36 drilled therethrough which is adaptable for attaching the lure to a conventional fishing line which is not shown. The body further includes a central opening 37 therethrough which provides a pair of opposite tabs 38 and 39 extending inwardly of the opening along the longitudinal axis of the body.

A conventional fishhook, indicated at 40, includes an eyelet 41 which is received about the tab 39 on the body. An elongated shank 42 extends rearwardly from the eyelet in diverging relation to the rearward portion of the body. A return bend portion 43 of the fishhook is rearwardly extended from the shank to terminate in a barbed end 44 which is adapted to rest within the V-shaped groove 35 of the body. A compressible spring 45 is received on and between the tabs 38 and 39 against the eyelet 41 of the fishhook. The force of the spring 45 thereby releasably retains the barbed end against the rearward portion of the body in a manner to close the return bend of the fishhook and keep it free of weeds and the like until opened by a fish striking the lure.

A bait simulating tail member 47 is shown attached to the return bend of the fishhook by an eyelet 48 to provide an additional luring effect and conceal the hook from the fish.

Third Form

A further form of the fish lure of the present invention is indicated at 50 in FIGS. 8 through 10. The lure 50 includes a substantially flat elongated body 51 having a rounded forward portion 52 and a tapered rearward portion 53. The forward portion includes a bore 54 which is adapted for connecting the lure to the usual fishing line. The rearward portion 53 is curved slightly from the plane of the forward portion of the body and provides a longitudinally extended V-shaped groove 55 therein. The body further includes a central opening 56 therethrough having a forwardly directed tab member 57 extended from the rearward portion 53 of the body. The forward portion of the body also has a transverse slot 58 which is disposed in spaced alignment with the tab 57 longitudinally of the body.

A fishhook 60 includes an elongated shank portion 61 having a forward eyelet 62 integral therewith which is received about the tab 57. The eyelet 62 defines a substantially rectangular opening therethrough for the purpose of precluding rotational displacement of the fishhook with respect to the body from the substantially right angular relationship shown in FIG. 10. A return bend portion 63 extends rearwardly from the shank and includes a barbed end 64 which is adapted to rest against the groove in the rearward portion of the body. An elongated substantially flat spring member 65 having opposite ends 66 and 67 includes a pair of flanges 68 and 69 thereon adjacent to their respective ends. The end 66 of the spring is received in the slot 58 against the flange 68 while the opposite end 67 is received between the eyelet 62 and the tab 57 against the flange 69. This distance between the slot and the eyelet is shorter than the length of the spring between its flanges which when installed causes the spring to be arched, applying a force against the eyelet thereby to maintain the barbed end of the fishhook against the body.

Operation

The operation of the described embodiments of the present invention is believed to be clearly apparent but is briefly summarized at this point. Referring first to the lure 10 of FIGS. 1 through 3, as the lure is cast through the air or drawn through the water, the rearwardly tapering body, in contact with the barbed end 27 of the fishhook, diverts any foreign matter or obstruction away from the barb which might otherwise become entangled thereon. The body of the lure is also adaptable to slide easily through such matter since there are no outward projections extending therefrom. The barb is further protected from any such matter not entirely diverted, by the upper portion 21 of the groove 19 releasably receiving the barb therein. The barb being disposed in the groove provides the additional advantage of concealing the barb from the fish.

Upon striking of the lure by a fish, the barbed end is immediately exposed by compression of the tail portion 13 towards the shank of the hook. Such action is provided in this design by the constriction 17 which permits the desired flexing between the head and tail portions of the lure. After the fish is disengaged from the hook, the rear portion of the body returns to its barb concealing and shielding position and the lure is ready for re-use.

The second form of the lure 30 shown in FIGS. 4 through 7 operates in essentially the same manner. While casting and fishing, the spring 45 urges the eye 41 rearwardly against the rearward end of the opening 37 into a plane substantially normal to the axis of the spring. This holds the barb 44 in the groove 35 where it is concealed and shielded against snagging debris and the like. When a fish bites the lure, the hook pivots upwardly as viewed in FIG. 5, with its shank against the ventral side of the body 31 so as to expose the hook and barb for fish catching purposes. When the fish is disengaged from the hook, the spring 45 returns the hook, to retracted position, shown in FIG. 5, for re-use.

Similarly, the third form of the lure 50 shown in FIGS. 8 through 10 provides a hook 60 which is concealed and shielded for casting and fishing by its associated body 51. The leaf spring 65 thrusts against the eyelet 62 and urges the hook in a clockwise pivoted position, as shown in FIG. 9, with the barb 64 rested in the groove 55. In such position the hook avoids accumulating debris and as in the other forms is shielded so as to minimize snagging fishermen, clothing and the like. When a fish bites the lure, the shank 61 of the hook pivots upwardly against the ventral side of the body overcoming the thrust of the spring 65 and exposing the barb 64 above the dorsal side of the body. As before, when a fish is disengaged from the lure, the leaf spring 65 returns the hook to retracted position, as shown in FIG. 8.

The three illustrative forms of the invention equally effectively conceal and shield their barbs for casting and fishing purposes, outwardly dispose their barbs for fish catching purposes when struck or bitten by a fish, and automatically recondition themselves for further use after fish removal. These successive actions are achieved by providing relatively pivotal body and hook members which are urged into retracted positions with the barbs of the hooks disposed in grooves of their respective bodies but which relatively pivot in the opposite directions by the application of forces thereto incident to the biting or striking of fish so as to expose the barbs for snagging purposes. Further, they are economical to produce, durable, and thoroughly effective in accomplishing their intended purposes.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claim so as to embrace any and all equivalent devices and apparatus.

Having described my invention, what I claim as new and desire to secure by Letters Patent is:

A weedless fish lure simulating live bait comprising a substantially rigid fishhook having a predetermined forward portion, a shank rearwardly extended therefrom, and a rearward portion providing a return bend having a barbed end and all disposed in a substantially common plane; and an elongated unitary body of substantially oval cross-section and of resiliently flexible material having opposite sides, opposite dorsal and ventral surfaces, a head end portion integral with said forward portion of the hook with said shank angularly rearwardly extended therefrom, a tail end portion rearwardly extended from said head end portion providing a centrally disposed groove therein in coplanar relation to said fishhook providing a lower portion extended longitudinally along the ventral surface of the tail portion and continuing upwardly forwardly in an upper portion along the dorsal surface terminating short of said head end portion of the body, said return bend of the hook being extended about the rearward portion of the body for alternate reception of the shank in said lower portion of the groove and said barbed end in the upper portion thereof, and a flexible constricted portion disposed in a plane substantially normal to the plane of the hook interconnecting said head end and said tail end portions of the body to permit movement of the tail end portion between said alternate hook receiving positions, said tail end portion being urged into position with the barbed end in the upper portion of the groove.

References Cited in the file of this patent

UNITED STATES PATENTS

| | | |
|---|---|---|
| 534,506 | Hastings | Feb. 19, 1895 |
| 1,604,027 | Dills | Oct. 19, 1926 |
| 2,163,378 | Horvath | June 20, 1939 |
| 2,215,908 | Lauby | Sept. 24, 1940 |
| 2,230,904 | Parkins | Feb. 4, 1941 |
| 2,242,708 | Lancaster | May 20, 1941 |
| 2,558,121 | Bailey | June 26, 1951 |
| 2,590,461 | Rasch | Mar. 25, 1952 |
| 2,817,922 | Takeshuta | Dec. 3, 1957 |
| 2,956,364 | Kuckiewicz | Oct. 18, 1960 |
| 2,991,580 | Shutrits | July 11, 1961 |